US011457120B2

(12) United States Patent
Xu et al.

(10) Patent No.: US 11,457,120 B2
(45) Date of Patent: Sep. 27, 2022

(54) WATERMARKS FOR TEXT CONTENT

(71) Applicant: Citrix Systems, Inc., Fort Lauderdale, FL (US)

(72) Inventors: Sai Xu, Nanjing (CN); Yuran Ou, Nanjing (CN); Qin Zhang, Nanjing (CN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 371 days.

(21) Appl. No.: 16/669,668

(22) Filed: Oct. 31, 2019

(65) Prior Publication Data

US 2021/0092255 A1 Mar. 25, 2021

Related U.S. Application Data

(63) Continuation of application No. PCT/CN2019/107518, filed on Sep. 24, 2019.

(51) Int. Cl.
*H04N 1/32* (2006.01)
*G06V 30/224* (2022.01)

(52) U.S. Cl.
CPC ....... *H04N 1/32219* (2013.01); *G06V 30/224* (2022.01); *H04N 2201/3266* (2013.01)

(58) Field of Classification Search
USPC ........... 382/100, 177, 232; 715/256; 341/90; 380/201
See application file for complete search history.

(56) References Cited

U.S. PATENT DOCUMENTS

| | | | | |
|---|---|---|---|---|
| 6,192,138 | B1 * | 2/2001 | Yamadaji | H04N 19/60 382/100 |
| 6,580,804 | B1 * | 6/2003 | Abe | G06T 1/0064 713/176 |
| 7,562,397 | B1 * | 7/2009 | Mithal | G06Q 30/0601 705/52 |
| 8,073,915 | B1 * | 12/2011 | Nandy | H04L 51/212 709/206 |
| 8,127,279 | B2 * | 2/2012 | Boltz | G06F 16/313 717/136 |

(Continued)

FOREIGN PATENT DOCUMENTS

| | | | |
|---|---|---|---|
| CN | 1259709 | A | 7/2000 |
| CN | 105095699 | A | 11/2015 |
| CN | 106570356 | A | 4/2017 |

OTHER PUBLICATIONS

PCT International Search Report and Written Opinion dated Jun. 28, 2020 for International Application No. PCT/CN2019/107518; 9 Pages.

*Primary Examiner* — Kathleen Y Dulaney
(74) *Attorney, Agent, or Firm* — Daly, Crowley, Mofford & Durkee, LLP

(57) ABSTRACT

Improved watermarking techniques for text content are disclosed. An example methodology implementing the techniques includes selecting a sequence of text characters to form a watermark and representing at least one text character of the sequence of text characters by a code which, when inserted into text content, does not affect the appearance of the text content. The methodology also includes embedding the code which represents the at least one text character of the watermark into text content so that the code enables identification of the at least one text character upon extraction of the code from the text content.

20 Claims, 11 Drawing Sheets

(56) References Cited

U.S. PATENT DOCUMENTS 8,160,294 B2 * 4/2012 Takahashi .......... H04N 1/32293 382/100
8,228,215 B1 * 7/2012 Runge .................. G06F 40/126 341/82
9,411,785 B1 * 8/2016 Wong .................... G06F 40/126
9,563,763 B1 * 2/2017 Roth ...................... G06F 21/36
9,614,675 B2 * 4/2017 Georgiev ................. H04L 9/30
9,881,516 B1 * 1/2018 Roth ....................... G09B 7/00
9,990,478 B2 * 6/2018 Ayzenshtat ............. G06F 21/10
10,157,270 B2 * 12/2018 Georgiev ................ G06F 21/10
10,461,772 B1 * 10/2019 Deng ..................... G06F 40/126
10,534,898 B2 * 1/2020 Balasa .................... G06F 21/16
10,755,375 B2 * 8/2020 Zheng ................... G06T 1/0021
2002/0146146 A1 * 10/2002 Miolla ................. G06Q 10/087 382/100
2003/0033530 A1 * 2/2003 Sharma ............. H04N 21/8358 713/176
2003/0161496 A1 * 8/2003 Hayashi ................ G06T 1/0028 382/232
2003/0210803 A1 * 11/2003 Kaneda .............. H04N 1/32203 382/232
2004/0001606 A1 1/2004 Levy
2004/0022411 A1 * 2/2004 Tamaru ................... G06T 1/005 382/232
2004/0133839 A1 * 7/2004 Cuttner .............. H04N 7/17309 348/E7.071
2004/0264691 A1 * 12/2004 Kalker ................. H04N 19/126 375/E7.14
2005/0166137 A1 * 7/2005 Tran ...................... G06F 40/166 715/206
2006/0025988 A1 * 2/2006 Xu ........................ G06F 40/263 704/8
2006/0075241 A1 * 4/2006 Deguillaume ..... H04N 1/32203 713/176
2006/0215233 A1 * 9/2006 Hirai .................. H04N 1/32122 358/448
2007/0014429 A1 * 1/2007 He ........................ H04L 9/3236 382/100
2007/0183626 A1 * 8/2007 Hashimoto ........ H04N 1/32203 382/100
2007/0211062 A1 * 9/2007 Engelman ............. G06T 11/203 358/1.11
2008/0209220 A1 * 8/2008 Oostveen .............. G06T 1/0064 713/176
2008/0267412 A1 * 10/2008 Oostveen .............. G10L 19/018 704/E19.009
2009/0097075 A1 * 4/2009 Harada .............. H04N 1/32219 358/3.28
2013/0166418 A1 * 6/2013 Wolf ...................... G06Q 30/02 705/27.1
2014/0003649 A1 * 1/2014 Wang .................... G06T 1/0021 382/100
2014/0016814 A1 * 1/2014 Baughman .............. G06F 21/16 382/100
2014/0157439 A1 * 6/2014 Ayzenshtat ............. G06F 21/10 726/32
2014/0157441 A1 * 6/2014 Georgiev ................ G06F 21/10 726/32
2016/0055607 A1 * 2/2016 Petrovic ................ G06T 1/0028 382/100
2017/0329943 A1 * 11/2017 Choi ....................... G06F 21/10
2018/0034802 A1 * 2/2018 Shelton ................... G06F 21/46
2018/0203983 A1 * 7/2018 Balasa .................... G06F 21/16
2018/0349517 A1 * 12/2018 Kleiman-Weiner ......................... G06F 16/9535
2019/0266632 A1 * 8/2019 Milford .............. G06Q 30/0272
2020/0074050 A1 * 3/2020 Balasa .................... G06F 21/16

* cited by examiner

500

502 504

506a 506b 506c

| | Text | Code | |
|---|---|---|---|
| 502a | 0 | &#8234 &#8204 &#8236 | 504a |
| 502b | 1 | &#8235 &#8204 &#8236 | 504b |
| 502c | 2 | &#8237 &#8204 &#8236 | 504c |
| 502d | 3 | &#8238 &#8204 &#8236 | 504d |
| 502e | 4 | &#8234 &#8205 &#8236 | 504e |
| 502f | 5 | &#8235 &#8205 &#8236 | 504f |
| 502g | 6 | &#8237 &#8205 &#8236 | 504g |
| 502h | 7 | &#8238 &#8205 &#8236 | 504h |
| 502i | 8 | &#8234 &#8206 &#8236 | 504i |
| 502j | 9 | &#8235 &#8206 &#8236 | 504j |
| 502k | A | &#8237 &#8206 &#8236 | 504k |
| 502l | B | &#8238 &#8206 &#8236 | 504l |
| 502m | C | &#8234 &#8207 &#8236 | 504m |
| 502n | D | &#8235 &#8207 &#8236 | 504n |
| 502o | E | &#8237 &#8207 &#8236 | 504o |
| 502p | F | &#8238 &#8207 &#8236 | 504p |
| 502q | G | &#8234 &#8236 | 504q |
| 502r | H | &#8235 &#8236 | 504r |
| 502s | I | &#8237 &#8236 | 504s |
| 502t | J | &#8238 &#8236 | 504t |

Traditional application management solutions have caused IT many problems, from having to repackage apps for every platform to being incompatible with the cloud—not to mention the strain on IT budgets.

1004

‮lanoitidarT‬ ‪application‬ ‫t‏managemen‬ ‭solutions‬ ‮evah‬ ‪caused‬ ‫‏IT‬ ‭many‬ ‮,smelborp‬ ‪from‬ ‫ing‏hav‬ ‭to‬ ‮egakcaper‬ ‪apps‬ ‫‏for‬ ‭every‬ ‮mroftalp‬ ‪to‬ ‫ng‏bei‬ ‭incompatible‬ ‮htiw‬ ‪the‬ ‫oud—not‏cl‬ ‭to‬ ‮noitnem‬ ‪the‬ ‫n‏strai‬ ‭on‬ ‮TI‬ ‪budgets.‬

1006 lanoitidarT application tmanagemen solutions evah caused many ,smelborp from inghav to egakcaper apps every mroftalp to ngbei incompatible htiw the oud—notcl to noitnem the nstrai on TI budgets.

FIG. 10

WATERMARKS FOR TEXT CONTENT

CROSS REFERENCE TO RELATED APPLICATIONS

This application a continuation of and claims the benefit of PCT Patent Application No. PCT/CN2019/107518 filed on Sep. 24, 2019 in the English language in the State Intellectual Property Office and designating the United States, the contents of which are hereby incorporated herein by reference in its entirety.

BACKGROUND

Watermarking is a widely used technique for marking and/or protecting content. A digital watermark is typically a pattern of bits embedded into digital content, such as digital content in a digital file. Digital watermarks are generally invisible to the human eye, but can be detected or otherwise recognized when the digitally watermarked content is downloaded or reproduced. Thus, when applied to digital content, digital watermarks may serve a marking function, a protection function and/or an identification function such as to identify an owner of content.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

The concepts, systems and techniques described herein relate to a form of a digital watermark referred to herein as a watermark. A watermark is formed from a sequence of codes and are invisible to the human eye. The codes may be arranged sequentially or interspersed between text characters.

In accordance with one example embodiment provided to illustrate the broader concepts, systems, and techniques described herein, a method may include selecting a sequence of text characters to form a watermark and representing at least one text character of the sequence of text characters by a code which, when inserted into text content, does not affect the appearance of the text content. The method may also include embedding the code which represents the at least one text character of the watermark into the text content so that the code enables identification of the at least one text character upon extraction of the code from the text content.

In one aspect, the code may include Unicode encodings.

In one aspect, representing at least one text character of the sequence of text characters by a code may include representing a plurality of text characters by a corresponding plurality of codes which, when inserted into text content, does not affect the appearance of the text content, and embedding the code into the text content further may include embedding the plurality of codes into the text content by distributing the plurality codes within the text content so as to make detection of the watermark more difficult.

In one aspect, embedding the code into the text content may include embedding a first code representing a first text character of the sequence of text characters into the text content at a first location, and embedding a second code representing a second text character of the sequence of text characters into the text content at a second location different from the first location.

In one aspect, embedding the code may include embedding the code multiple times into the text content.

In one aspect, the sequence of text characters may convey user identification information or a name or a notice, such as a copyright notice.

In one aspect, the sequence of text characters may be a sequence of distinct text characters.

In one aspect, the watermark may be one watermark in a group of watermarks.

In one aspect, embedding the codes may include embedding the codes in sequence.

In one aspect, the code representing the at least one text character of the sequence of text characters may be embedded into the text content based on a rule configured to identify sensitive information in the text content.

In one aspect, the watermark formed using the sequence of text characters is a first watermark, and the method may also include selecting one or more control characters to form a second watermark, wherein the one or more control characters affects the appearance of the text content, embedding the one or more control characters of the second watermark into the text content, and changing the text content to counteract the effect of the embedded one or more control characters.

In one aspect, the one or more control characters of the second watermark may be embedded into the text content based on a rule configured to identify sensitive information in the text content.

According to another illustrative embodiment provided to illustrate the broader concepts described herein, a method may include selecting one or more control characters to form a watermark, the one or more control characters, when inserted into text content, affect the appearance of the text content. The method may also include embedding the one or more control characters of the watermark into the text content and changing the text content to counteract the effect of the embedded one or more control characters such that the text content appears as intended when displayed.

In one aspect, the one or more control characters of the watermark may be embedded into the text content based on a rule configured to identify sensitive information in the text content.

In one aspect, the one or more control characters of the watermark may be embedded into the text content multiple times.

According to another illustrative embodiment provided to illustrate the broader concepts described herein, a non-transitory machine-readable medium may encode instructions that when executed by one or more processors cause a process to be carried out. The process may include selecting a sequence of text characters to form a watermark and representing at least one text character of the sequence of text characters by a code which, when inserted into text content, does not affect the appearance of the text content. The process may also include embedding the code which represents the at least one text character of the watermark into the text content so that the code enables identification of the at least one text character upon extraction of the code from the text content.

According to another illustrative embodiment provided to illustrate the broader concepts described herein, a non-transitory machine-readable medium may encode instructions that when executed by one or more processors cause a process to be carried out. The process may include selecting one or more control characters to form a watermark, the one or more control characters, when inserted into text content, affect the appearance of the text content. The process may also include embedding the one or more control characters of the watermark into the text content and changing the text content to counteract the effect of the embedded one or more control characters such that the text content appears as intended when displayed.

According to another illustrative embodiment provided to illustrate the broader concepts described herein, a system includes a memory and one or more processors in communication with the memory. The processor may be configured to select a sequence of text characters to form a watermark, represent at least one text character of the sequence of text characters by a code which, when inserted into text content, does not affect the appearance of the text content, and embed the code which represents the at least one text character of the watermark into the text content so that the code enables identification of the at least one text character upon extraction of the code from the text content.

In one aspect, to embed the code into the text content may include to embed a first code representing a first text character of the sequence of text characters into the text content at a first location, and embed a second code representing a second text character of the sequence of text characters into the text content at a second location different from the first location.

In one aspect, to embed the code into the text content may include to embed the code into the text content multiple times at different locations in the text content.

In one aspect, the watermark formed using the sequence of text characters is a first watermark, and the processor may be further configured to select one or more control characters to form a second watermark, wherein the one or more control characters affects the appearance of the text content, embed the one or more control characters of the second watermark into the text content, and change the text content to counteract the effect of the embedded one or more control characters.

According to another illustrative embodiment provided to illustrate the broader concepts described herein, a system includes a memory and one or more processors in communication with the memory. The processor may be configured to select one or more control characters to form a watermark, the one or more control characters, when inserted into text content, affect the appearance of the text content, embed the one or more control characters of the watermark into the text content, and change the text content to counteract the effect of the embedded one or more control characters such that the text content appears as intended when displayed.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 5 is a diagram showing a code map, in accordance with an embodiment of the present disclosure.

FIG. 10 illustrates the use of watermarks generated using a code map and watermarks that alter the display of neighboring characters, in accordance with an embodiment of the present disclosure.

DETAILED DESCRIPTION

Figure 1:
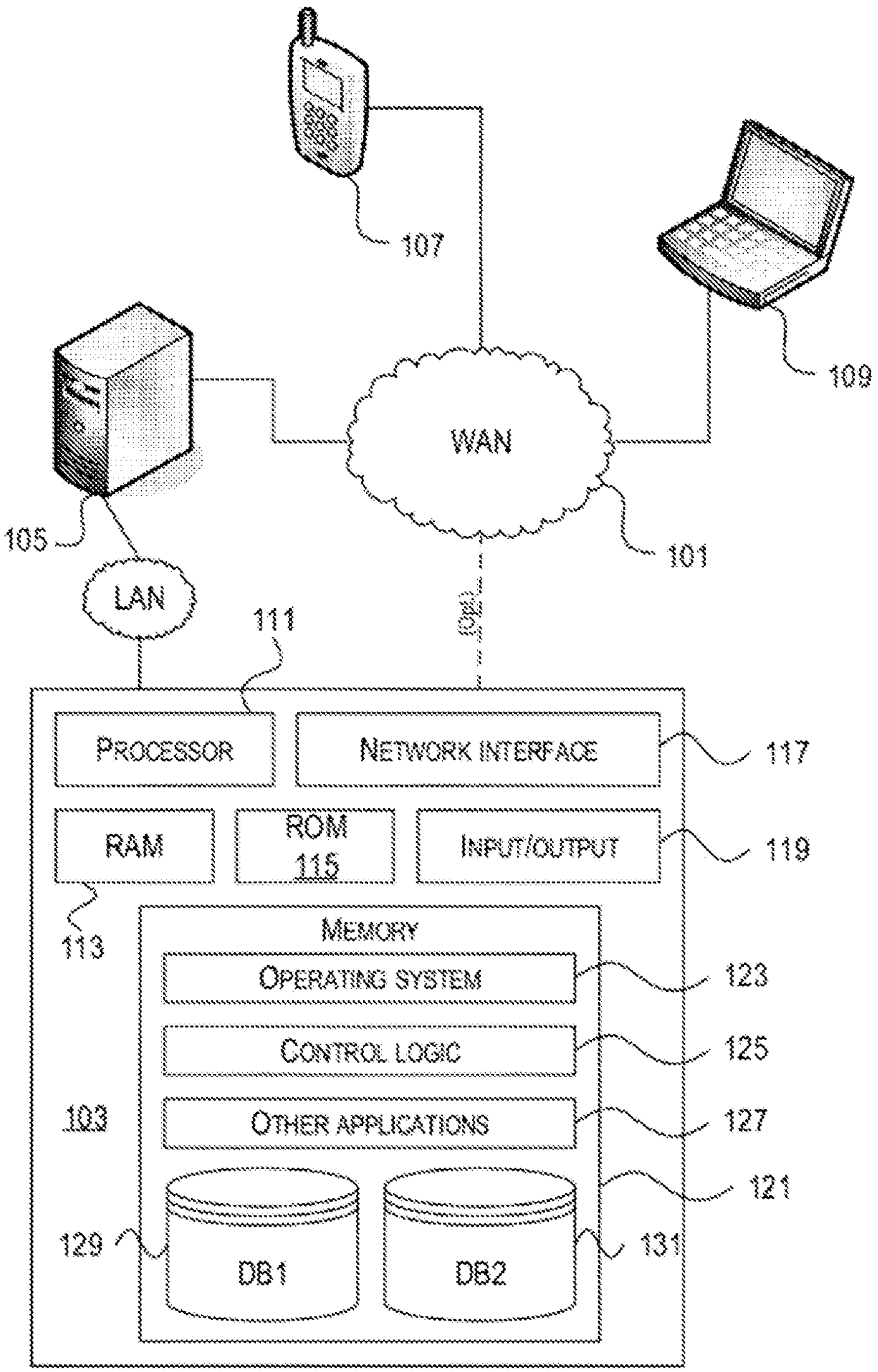
FIG. 1 depicts an illustrative computer system architecture that may be used in accordance with one or more illustrative aspects of the concepts described herein.

A digital watermark may serve a protection function, an identification function or an identification function of digital content. For example, a digital watermark may be used to protect or identify digital content for a variety of reasons, including, but not limited to: to prevent or deter tampering, to provide copyright protections, to provide notice or information, and/or to provide digital rights management controls over the digital content, to identify an owner or a creator of the content, to name but a few examples.

While conventional digital watermarks can be embedded into digital content to protect or mark the digital content, such digital watermarks may be transformed, stripped, or otherwise removed from the digital content, thus making it difficult and, in some instances impossible to track the use or distribution of the digital content. For example, digital watermarks in text content may be readily transformed and removed using existing text editors.

Ideally, digital watermarks are robust against transformation of digital content (for example, against reformatting, removal or otherwise changing and/or modifying removal of the digital watermark from the content that includes the digital watermark. In accordance with embodiments disclosed herein, improved watermarking techniques for text content are disclosed. In particular, the concepts, systems and techniques described herein relate to a form of a digital watermark referred to herein as a watermark. A watermark is formed from a sequence of codes and are invisible to the human eye. As will become apparent from the description hereinbelow, a watermark is embedded in text content and the codes which collectively form the watermark may be arranged sequentially or interspersed between text characters.

The improved watermarking techniques described herein enable a user to embed a watermark into text content in a manner such that the watermark is robust. As used herein, the term "watermark" refers to a sequence of characters which may be embedded into text content without changing the visual appearance of the text content. That is, the sequence of characters embedded into the text content are invisible (i.e., invisible to a viewer seeing or otherwise observing text content on a display or other visually perceptible media) and thus, the embedded sequence of characters which form the watermark do not change the visual appearance of the text content in which the watermark is embedded.

According to an embodiment, a code map is utilized to generate a watermark (i.e., the sequence of characters) that may be embedded into text content. The code map includes mappings between text characters and respective codes. The codes in the code map neither have a visual appearance nor affect the appearance of neighboring text characters.

In some embodiments, a watermark may include a sequence of codes from the code map. The watermark may then be applied to text content by embedding the sequence of codes representing the watermark into the text content.

In some embodiments, the sequence of codes representing the watermark may first be segmented or otherwise divided to provide segments or pieces, and the segments of the sequence of codes (i.e., watermark pieces) may be embedded into the text content. As an example, embedding watermarks segments into the text content increases the difficulty of identifying and extracting of the watermark from the text content since all of the watermark pieces would need to be identified and extracted.

In some embodiments, a watermark generated using the code map and a watermark generated using control characters (i.e., non-printing character) that affect the appearance or behavior of neighboring characters may be embedded in text content. In other words, the text content can include both watermarks generated using the code map and watermarks generated using control characters that affect the appearance or behavior of neighboring characters. As will be further described below, this further increases the robustness of the watermark in that, even if the embedded watermarks are somehow extracted from the text content, extraction of the watermarks will cause at least some of the text content to be displayed in an incomprehensible order.

Although certain embodiments and/or examples are described herein in the context of the Unicode character encoding, it will be appreciated in light of this disclosure that such embodiments and/or examples are not restricted to Unicode character encoding implementations but are applicable to character encodings and sets in the general sense, and this disclosure should not be construed as limited in this regard. These and other advantages and embodiments will be apparent in light of this disclosure.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the concepts described herein in a standalone and/or networked environment. Various network node devices 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topologies and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components and devices which make up the system of FIG. 1 may include a data server 103, a web server 105, and client computers 107, 109. Data server 103 provides overall access, control and administration of databases and control software for performing one or more illustrative aspects of the concepts described herein. Data server 103 may be connected to web server 105 through which users interact with and obtain data as requested. Alternatively, data server 103 may act as a web server itself and be directly connected to the Internet. Data server 103 may be connected to web server 105 through local area network 133, wide area network 101 (e.g., the Internet), via direct or indirect connection, or via some other network. Users may interact with data server 103 using remote computers 107, 109, e.g., using a web browser to connect to data server 103 via one or more externally exposed web sites hosted by web server 105. Client computers 107, 109 may be used in concert with data server 103 to access data stored therein or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used in the system architecture and data processing device of FIG. 1, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of data server 103. Data server 103 may further include a random access memory (RAM) 113, a read only memory (ROM) 115, a network interface 117, input/output interfaces 119 (e.g., keyboard, mouse, display, printer, etc.), and a memory 121. Input/output (I/O) interfaces 119 may include a variety of interface units and drives for reading, writing, displaying, and/or printing data or files. Memory 121 may store operating system software 123 for controlling overall operation of the data server 103, control logic 125 for instructing data server 103 to perform aspects of the concepts described herein, and other application software 127 providing secondary, support, and/or other functionality which may or might not be used in conjunction with aspects of the concepts described herein. Control logic

125 may also be referred to herein as the data server software. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the concepts described herein. Memory 121 may include, for example, a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to data server 103. Those of skill in the art will appreciate that the functionality of data server 103 (or device 105, 107, or 109) as described herein may be spread across multiple data processing devices, for example, to distribute processing load across multiple computers, to segregate transactions based on geographic location, user access level, quality of service (QoS), etc.

One or more aspects of the concepts described here may be embodied as computer-usable or readable data and/or as computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) Hypertext Markup Language (HTML) or Extensible Markup Language (XML). The computer executable instructions may be stored on a computer readable storage medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source node and a destination node (e.g., the source node can be a storage or processing node having information stored therein which information can be transferred to another node referred to as a "destination node"). The media can be transferred in the form of electromagnetic waves traveling through signal-conducting media such as metal wires, optical fibers, and/or wireless transmission media (e.g., air and/or space). Various aspects of the concepts described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects of the concepts described herein, and such data structures are contemplated within the scope of computer executable instructions and computer-usable data described herein.

Figure 2:
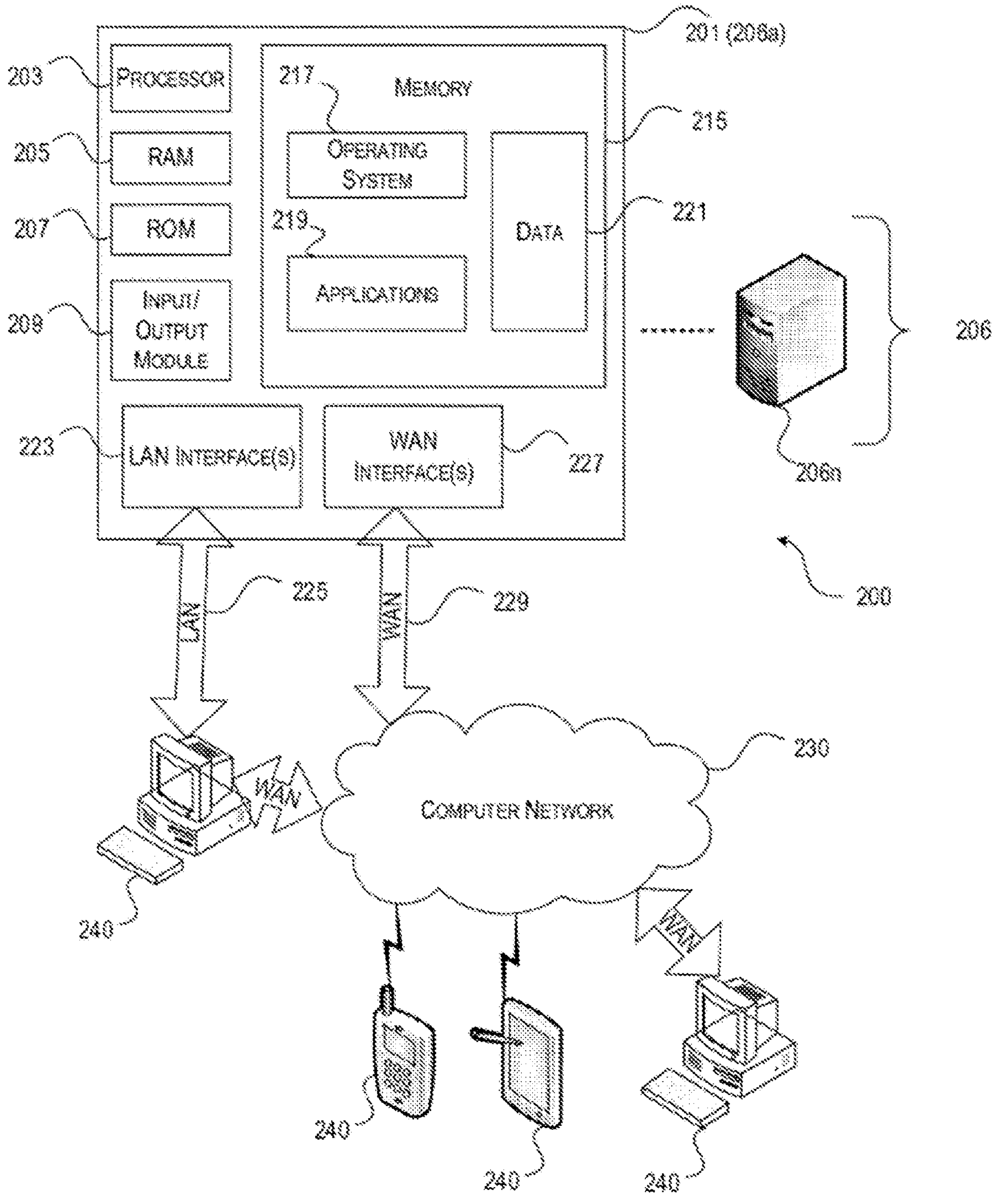
FIG. 2 depicts an illustrative remote-access system architecture that may be used in accordance with one or more illustrative aspects of the concepts described herein.

With further reference to FIG. 2, one or more aspects of the concepts described herein may be implemented in a remote-access environment. FIG. 2 depicts an example system architecture including a computing device 201 in an illustrative computing environment 200 that may be used according to one or more illustrative aspects of the concepts described herein. Computing device 201 may be used as a server 206*a* in a single-server or multi-server desktop virtualization system (e.g., a remote access or cloud system) configured to provide virtual machines (VMs) for client access devices. Computing device 201 may have a processor 203 for controlling overall operation of the server and its associated components, including a RAM 205, a ROM 207, an input/output (I/O) module 209, and a memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). Terminals 240 may be personal computers, mobile devices, laptop computers, tablets, or servers that include many or all the elements described above with respect to data server 103 or computing device 201. The network connections depicted in FIG. 2 include a local area network (LAN) 225 and a wide area network (WAN) 229 but may also include other networks. When used in a LAN networking environment, computing device 201 may be connected to LAN 225 through an adapter or network interface 223. When used in a WAN networking environment, computing device 201 may include a modem or other wide area network interface 227 for establishing communications over WAN 229, such as to computer network 230 (e.g., the Internet). It will be appreciated that the network connections shown are illustrative and other means of establishing a communication link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects of the concepts described herein may also be operational with numerous other general purpose or special purpose computing system environments or configurations. Examples of other computing systems, environments, and/or configurations that may be suitable for use with aspects of the concepts described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more terminals 240 may be in communication with one or more servers 206*a*-206*n* (generally referred to herein as "server(s) 206"). In one embodiment, computing environment 200 may include a network appliance installed between server(s) 206 and terminals 240. The network appliance may manage client/server connections, and in some cases can load balance client connections amongst a plurality of back-end servers 206.

Terminals 240 may in some embodiments be referred to as a single computing device or a single group of client computing devices, while server(s) 206 may be referred to as a single server 206 or a group of servers 206. In one embodiment, a single terminal 240 communicates with more than one server 206, while in another embodiment a single server 206 communicates with more than one terminal 240. In yet another embodiment, a single terminal 240 communicates with a single server 206.

Terminal 240 can, in some embodiments, be referred to as any one of the following non-exhaustive terms: client machine(s); client(s); client computer(s); client device(s); client computing device(s); local machine; remote machine; client node(s); endpoint(s); or endpoint node(s). Server 206, in some embodiments, may be referred to as any one of the following non-exhaustive terms: server(s), local machine; remote machine; server farm(s), or host computing device(s).

In one embodiment, terminal 240 may be a VM. The VM may be any VM, while in some embodiments the VM may be any VM managed by a Type 1 or Type 2 hypervisor, for example, a hypervisor developed by Citrix Systems, IBM, VMware, or any other hypervisor. In some aspects, the VM may be managed by a hypervisor, while in other aspects the VM may be managed by a hypervisor executing on server 206 or a hypervisor executing on terminal 240.

Some embodiments include a terminal, such as terminal 240, that displays application output generated by an application remotely executing on a server, such as server 206, or other remotely located machine. In these embodiments, terminal 240 may execute a VM receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

Server 206, in some embodiments, uses a remote presentation protocol or other program to send data to a thin-client or remote-display application executing on the client to present display output generated by an application executing on server 206. The thin-client or remote-display protocol can be any one of the following non-exhaustive list of protocols: the Independent Computing Architecture (ICA) protocol developed by Citrix Systems, Inc. of Fort Lauderdale, Fla.; or the Remote Desktop Protocol (RDP) manufactured by Microsoft Corporation of Redmond, Wash.

A remote computing environment may include more than one server 206*a*-206*n* logically grouped together into a server farm 206, for example, in a cloud computing environment. Server farm 206 may include servers 206*a*-206*n* that are geographically dispersed while logically grouped together, or servers 206*a*-206*n* that are located proximate to each other while logically grouped together. Geographically dispersed servers 206*a*-206*n* within server farm 206 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, server farm 206 may be administered as a single entity, while in other embodiments server farm 206 can include multiple server farms.

In some embodiments, server farm 206 may include servers that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server, a master application server, a server executing an active directory, or a server executing an application acceleration program that provides firewall functionality, application functionality, or load balancing functionality. Other server types may also be used.

Some embodiments include a first server 206*a* that receives requests from terminal 240, forwards the request to a second server 206*b* (not shown), and responds to the request generated by terminal 240 with a response from second server 206*b* (not shown). First server 206*a* may acquire an enumeration of applications available to terminal 240 as well as address information associated with an application server 206 hosting an application identified within the enumeration of applications. First server 206*a* can present a response to the client's request using a web interface and communicate directly with terminal 240 to provide terminal 240 with access to an identified application. One or more terminals 240 and/or one or more servers 206 may transmit data over network 230, e.g., network 101.

Figure 3:
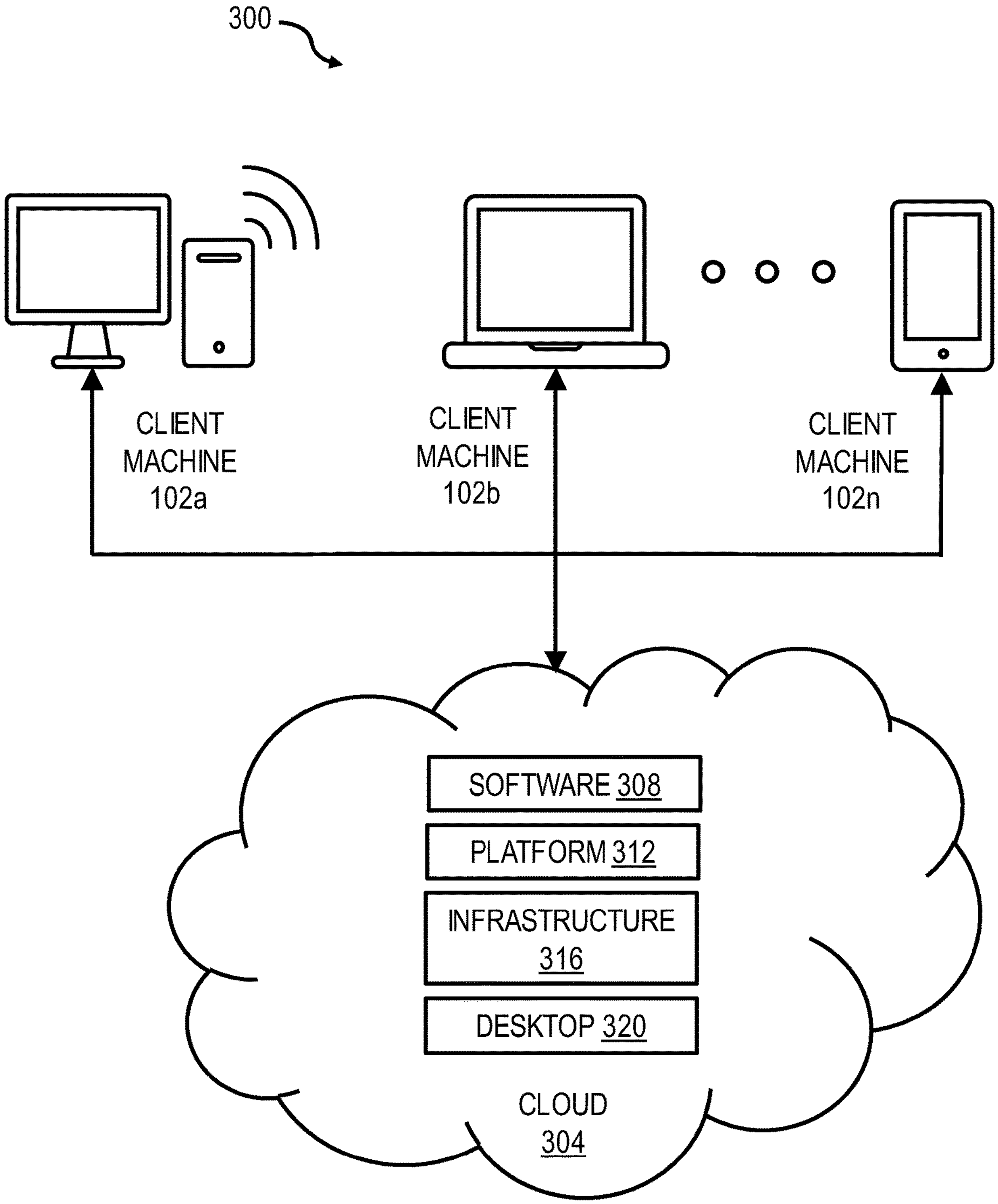
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102*a*-102*n* (such as those described above) are in communication with a cloud network 304. Cloud network 304 may include back-end platforms, e.g., servers, storage, server farms or data centers. The users or clients 102*a*-102*n* can correspond to a single organization/tenant or multiple organizations/tenants. More particularly, in one example implementation cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used.

Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102*a*-102*n* or the enterprise/tenant. The servers may be located off-site in remote geographical locations or otherwise.

Cloud computing environment 300 can provide resource pooling to serve multiple users via clients 102*a*-102*n* through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102*a*-102*n*. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by laaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
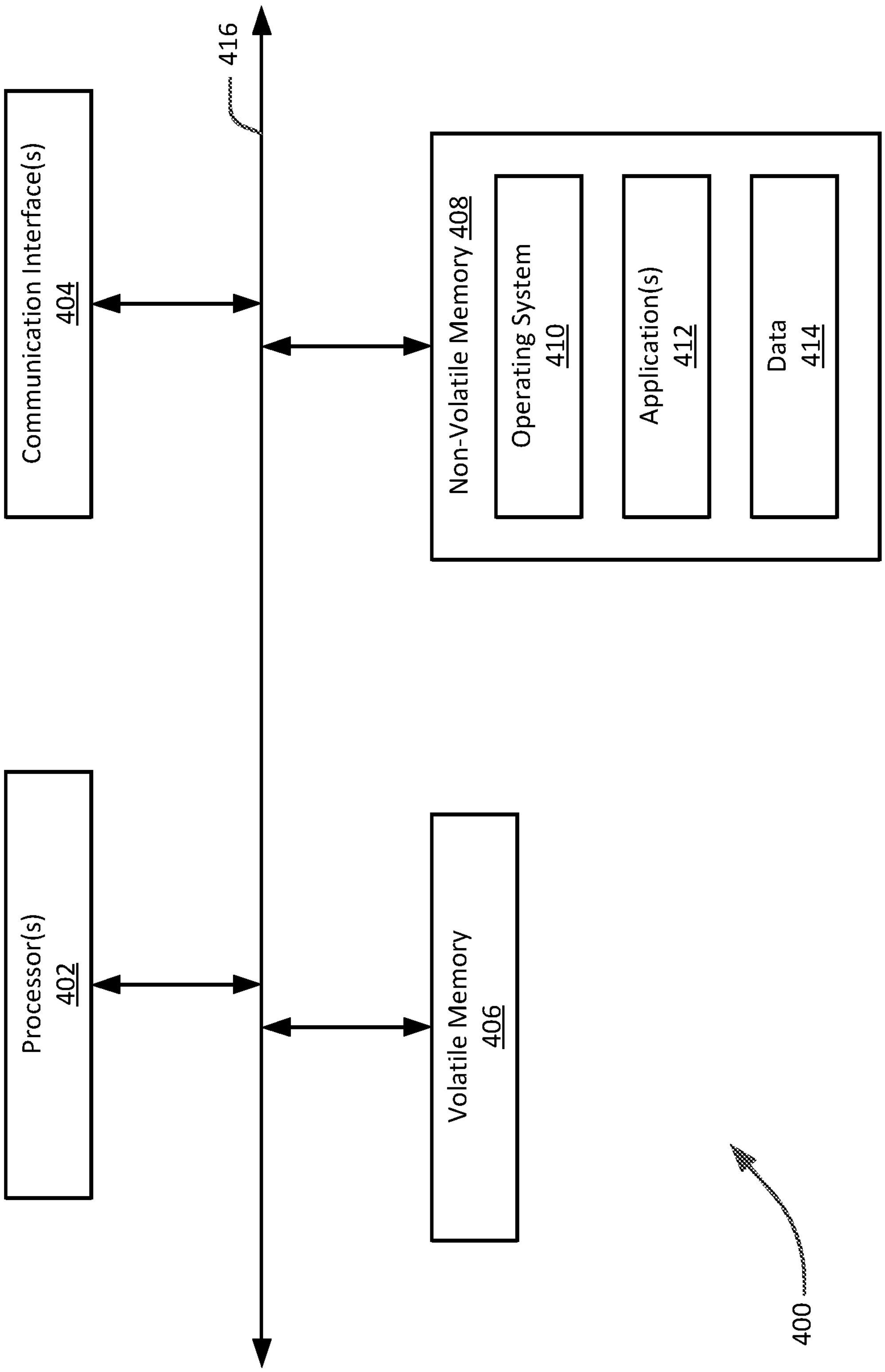
FIG. 4 is a block diagram illustrating selective components of an example computing device in which various aspects of the disclosure may be implemented, in accordance with an embodiment of the present disclosure.

FIG. 4 is a block diagram illustrating selective components of an example computing device 400 in which various aspects of the disclosure may be implemented, in accordance with an embodiment of the present disclosure. Computing device 400 is shown merely as an example of components 105, 107, and 109 of FIG. 1, terminals 240 of FIG. 2, and/or client machines 102*a*-102*n* of FIG. 3, for instance. However, the illustrated computing device 400 is shown merely as an example and one skilled in the art will appreciate that components 105, 107, and 109 of FIG. 1, terminals 240 of FIG. 2, and/or client machines 102*a*-102*n* of FIG. 3 may be implemented by any computing or processing environment and with any type of machine or set of machines that may have suitable hardware and/or software capable of operating as described herein.

As shown in FIG. 4, computing device 400 includes one or more processor(s) 402, one or more communication interface(s) 404, a volatile memory 406 (e.g., random access memory (RAM)), a non-volatile memory 408, and a communications bus 416.

Non-volatile memory 408 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

Non-volatile memory 408 stores an operating system 410, one or more applications 412, and data 414 such that, for example, computer instructions of operating system 410 and/or applications 412 are executed by processor(s) 402 out of volatile memory 406. For example, in some embodiments, applications 412 may cause computing device 400 to implement functionality in accordance with the various embodiments and/or examples described herein. In some embodiments, volatile memory 406 may include one or more types of RAM and/or a cache memory that may offer a faster response time than a main memory. Data may be entered using an input device of computing device 400 or received from I/O device(s) communicatively coupled to computing device 400. Various elements of computing device 400 may communicate via communications bus 416.

Processor(s) 402 may be implemented by one or more programmable processors to execute one or more executable instructions, such as applications 412 and/or a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, processor 402 can be embodied in one or more application specific integrated circuits (ASICs), microprocessors, digital signal processors (DSPs), graphics processing units (CPUs), microcontrollers, field programmable gate arrays (FPGAs), programmable logic arrays (PLAs), multi-core processors, or general-purpose computers with associated memory.

Processor 402 may be analog, digital or mixed signal. In some embodiments, processor 402 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communication interface(s) 404 may include one or more interfaces to enable computing device 400 to access a computer network such as a Local Area Network (LAN), a Wide Area Network (WAN), a Personal Area Network (PAN), or the Internet through a variety of wired and/or wireless connections, including cellular connections.

In described embodiments, computing device 400 may execute an application on behalf of a user of a client device. For example, computing device 400 may execute one or more virtual machines managed by a hypervisor. Each virtual machine may provide an execution session within which applications execute on behalf of a user or a client device, such as a hosted desktop session. Computing device 400 may also execute a terminal services session to provide a hosted desktop environment. Computing device 400 may provide access to a remote computing environment including one or more applications, one or more desktop applications, and one or more desktop sessions in which one or more applications may execute.

For example, in some embodiments, a first computing device 400 may execute an application on behalf of a user of a client computing device (e.g., client 107 or 109 of FIG. 1), may execute a VM, which provides an execution session within which applications execute on behalf of a user or a client computing device (e.g., any of client machines 102*a*-102*n* of FIG. 3), such as a hosted desktop session, may execute a terminal services session to provide a hosted desktop environment, or may provide access to a computing environment including one or more of: one or more applications, one or more desktop applications, and one or more desktop sessions in which one or more applications may execute.

As will be described in more detail below in conjunction with FIGS. 5-12, and in accordance with an illustrative embodiment, a code map for use in generating watermarks may be generated. Coded character sets provide character encodings that map a code point to a character. A code point is a unique number assigned to each character.

A coded character set, such as the Unicode character set for example, may assign code points to control characters that that do not have a visible appearance, but may have an effect on the appearance or behavior of neighboring characters. However, certain control characters may negate the effect of other control characters. Thus, such a control character (or control characters) that negates the effect of another control character (or other control characters) can be appropriately grouped or combined such that the control characters in such combinations do not have an effect on the appearance or behavior of neighboring characters. In other words, certain combinations of control characters (i.e., combinations of code points representing control characters) do not have a visual appearance and do not affect the appearance or behavior of neighboring characters. This allows for such combinations of control characters to be embedded or otherwise included in text content and not affect the appearance of the text content when the text content is displayed. Moreover, such combinations of control characters maintain their nonvisual characteristic and, thus, are not displayed when the text content is displayed.

For example, taking the Unicode character encoding as an example, the code point ‬ (representing the Pop Directional Formatting control character) disables the effect of a preceding ‪ (code point representing the Left-To-Right Embedding control character), ‫ (code point representing the Right-To-Left Embedding control character), ‭ (code point representing the Left-To-Right Override control character), or ‮ (code point representing the Right-To-Left Override control character). For example, the combination of the code point ‪ followed by the code point ‬ (i.e., ‪ ‬) neither has a visual appearance nor affects the appearance or behavior of neighboring characters. So, the combination of code points "‪ ‬" can be embedded in text content and not affect the appearance of the text content when the text content is displayed. Also, the combination of code points "‪ ‬" does not have a visual appearance and, thus, is not displayed when the text content is displayed. Likewise, combinations of code points "‫ ‬", "‭ ‬", and "‮ ‬" do not have a visual appearance and can similarly be embedded into text content and not affect the appearance of the text content when the text content is displayed.

As another example, the code points ‌ (code point representing the Zero Width Non-Joiner), ‍ (code point representing the Zero Width Joiner), ‎ (code point representing the Left-To-Right Mark), and ‏ (code point representing the Right-To-Left Mark) do not affect the appearance or behavior of neighboring characters when placed after another control character. That is, the code point ‌ placed after a control point representing another control character, such as ‪, ‫, ‭, or ‮, for example, neither has a visual appearance nor affects the appearance or behavior of neighboring characters. In other words, the code point ‌ (the Zero Width Non-Joiner) is disabled and has no effect on the appearance or behavior of neighboring characters when placed after a code point representing another control character. Likewise, any one of the code points ‍ , and ‏ placed after a control point representing another control character neither has a visual appearance nor affects the appearance or behavior of neighboring characters. Thus, the code points ‌, ‍, ‎, and ‏ can be appropriately embedded into combinations of code points that do not have an effect on the appearance or behavior of neighboring characters (e.g., "‫ ‌ ‬", "‫ ‍ ‬", "‫ ‎ ‬" "‫ ‏ ‬", and so on) to generate further combinations of code points that do not affect the appearance or behavior of neighboring characters. The resulting combinations of code points also do not affect the appearance or behavior of neighboring characters since the embedded code point does not affect the appearance or behavior of neighboring characters when placed after a code point representing another control character in this manner. These combinations of code points can then be embedded into text and not affect the appearance of the text content when the text content is displayed. It will be appreciated in light of this disclosure that other combinations of control characters (e.g., combinations of code points representing the control characters) may not have a visual appearance nor affect the appearance or behavior of neighboring characters.

In one such embodiment, a code map includes mappings between text characters and respective codes, wherein each code includes a combination of code points representing control characters. Additionally, each code (combination of code points) in the code map does not have a visual appearance and does not affect the appearance or behavior of neighboring characters. The encoded text characters from the code map can then be used to generate a watermark for embedding into text content. More specifically, a sequence of codes that correspond to the text characters of the generated watermark can be embedded into the text content. For example, suppose a code map includes mappings for the text characters A though Z. Then, using this code map, watermarks can be generated that includes any numbers and/or combinations of the codes of the text characters A through Z, such as “JOE”, “JACK”, “MEGAMANSION”, and “ZEBRA”, to provide a few examples. Note that the watermark does not include the actual text characters but, rather, the encoded text characters (i.e., the codes that correspond to the text characters). The code map can also be used to decode or decipher the codes included in the watermark to determine the text characters of the watermark.

In some embodiments, the encoded text characters from the code map may be used to generate watermarks that convey information. For example, the encoded text characters may be used to generate a watermark that includes a copyright notice. In another example, the encoded text characters may be used to generate a watermark that includes a name of a person or service that is providing or receiving the text data. In still another example, the encoded text characters may be used to generate watermarks that uniquely identify objects. For example, in one implementation, the generated watermarks may include user identifiers (user IDs) that uniquely identify users, such as users of a system or server, users of a service, or employees or members of an organization, to provide three examples.

In certain embodiments, a watermark may be segmented into smaller pieces, and each segment or piece of the watermark embedded into text content to digitally watermark the text content. In such embodiments, each piece of the watermark is a code or multiple codes. That is, a watermark can be segmented at a code boundary (e.g., between two successive codes) such that the watermark pieces generated by the segmenting includes one or more whole codes and not a portion of a code. In this way, since codes are composed of a combination of code points that does not affect the appearance or behavior of neighboring characters, the watermark piece also do not affect the appearance or behavior of neighboring characters. Further, since the codes do not have a visual appearance, the watermark pieces do not have a visual or spatial representation when the text content including the watermark piece is displayed. For example, suppose a watermark includes the encoded text characters “JANE” (i.e., the codes for the text characters “JANE”). In this example case, the watermark may be segmented to smaller watermark pieces such as “J”, “A”, “N”, “E”, “JA”, “AN”, “NE”, JAN”, and “ANE”, to provide some examples. The generated watermark pieces can then be embedded into text content. In an embodiment, the watermark pieces may be embedded at distinct locations (i.e., different locations) in the text content. It will be appreciated in light of this disclosure that segmenting a watermark in this way and embedding the watermark pieces at distinct locations in the text content make it more difficult for a bad or unscrupulous actor to remove the watermark from the text content. For instance, unlike removing a watermark from a single location in the text content, the bad actor will have to identify and remove watermark pieces from multiple locations in the text content.

In some embodiments, watermark pieces may be embedded into the text content in sequence. Taking the watermark “JANE” segmented into watermark pieces “J”, “A”, “N”, and “E”, the watermark pieces can be embedded into the text content in the sequence “J”, “A”, “N”, and “E”. In an embodiment, the watermark pieces may be embedded into the text content multiple number of times. For example, taking the above example of the watermark pieces “J”, “A”, “N”, and “E”, one sequence where the watermark pieces are embedded multiple times may be “J”, “A”, “N”, “E”, “J”, “A”, “N”, “E”, “J”, “A”, “N”, and “E”. Another sequence where the watermark pieces are embedded multiple times may be “J”, “A”, “N”, “E”, “J”, “A”, and “N”. Other sequences will be readily apparent. In some embodiments, the watermark pieces may be embedded into the text content such that a watermark piece is embedded at preconfigured or preestablished intervals, such as every five words, six words, seven words, ten words, fifteen words, or any suitable number of words. Note that decreasing the interval between watermark pieces increases the robustness of the watermark in that it is more difficult for a bad actor to use portions of the text content without detection. However, decreasing the interval results in a corresponding increase in the size of the text content since more watermark pieces are embedded. In certain embodiments, the interval may be a tunable parameter that is specified in a configuration file, and a user (or system administrator) may tune or adjust the interval parameter based on a desired performance, such as a desired balance between robustness of the watermark and resulting increase in the size of the text content. For example, the interval may be decreased based on sensitivity of the text content.

In certain embodiments, the encoded text characters from the code map may be used to generate watermarks that convey information. For example, the encoded text characters from the code map may be used to generate a watermark that includes a copyright notice. In another example, the encoded text characters from the code map may be used to generate a watermark that includes a name of a person or service that is providing or receiving the text data. In still another example, the encoded text characters from the code map may be used to generate watermarks that uniquely identify objects. For example, in one implementation, the generated watermarks may include user identifiers (user IDs) that uniquely identify users, such as users of a system or server, users of a service, or employees or members of an organization, to provide three examples.

In some embodiments, the generated watermark may be comprised of distinct encoded text characters (i.e., no repeated encoded text characters in the watermark). Taking the example case of user IDs as watermarks, assuming user IDs that include four distinct encoded text characters from a code map of 20 encoded text characters, 116,280 (i.e., P(20,4)=20!/(20−4)!) user ID watermarks can be generated in which the encoded text characters in the watermark are distinct. For example, assuming the 20 encoded text characters in the code map to be the first 20 characters of the alphabet A-T, examples of such user ID watermarks include ABCD, ACRE, JFQN, and LRCE, to provide a few examples. Other user ID watermarks that include four distinct encoded text characters will be readily apparent. It will be appreciated in light of this disclosure that generating watermarks (e.g., user IDs) that do not include repeated text characters increases the robustness of the watermark in that such watermarks may be reconstructed (regenerated) by combining pieces or portions of the watermark and removing any repeated instances of the encoded text characters. Thus, embedding pieces of such watermarks into text content make it more difficult for a bad or otherwise unscrupulous actor to use portions of the text content without detection.

In certain embodiments, the watermarks comprised of possible combinations of the same encoded text characters may be combined to form a group of watermarks. To provide an example, all the watermarks comprised of possible combinations of the encoded text characters "A", "B", "C", and "D" may be combined to form a group of watermarks. In this example, the group of watermarks includes the watermarks having the following possible combinations of the four encoded text characters "A", "B", "C", and "D":

| | | | |
|---|---|---|---|
| ABCD | BCDA | CDAB | DABC |
| ABDC | BDCA | DCAB | CABD |
| ACBD | CBDA | BDAC | DACB |
| ACDB | CDBA | DBAC | BACD |
| ADBC | DBCA | BCAD | CADB |
| ADCB | DCBA | CBAD | BADC |

In this case, the watermark including any of the combinations of the four encoded text characters above (e.g., the watermark "ABCD", the watermark "BCDA", etc.) may be considered a watermark in the group of watermarks comprised of possible combinations of the encoded text characters "A", "B", "C", and "D". To provide another example, the watermarks comprised of possible combinations of the encoded text characters "B", "I", and "G" may be combined to form a group of watermarks. In this example case, watermarks in this group of watermarks include the watermark "BIG", the watermark "BGI", the watermark "IBG" the watermark "IGB", the watermark "GBI" and the watermark "GIB". It will be appreciated in light of this disclosure that use of such groups of watermarks may further increase the robustness of watermarks in that any combination of the necessary encoded text characters is sufficient to reconstruct a watermark in a group. Thus, use of even a small number and/or small portions of text content embedded with pieces of a watermark belonging to a group of watermarks may be readily detected by reconstructing the watermark even from such small number and/or small portions of text content used without authorization.

In the example case of user IDs, a user may be assigned a group of watermarks as a user ID. For example, the group of watermarks that includes the watermarks comprised of possible combinations of the encoded text characters "A", "B", "C", and "D" above may be assigned to the user as a user ID. In this case, the user can be assigned as many as 24 (i.e., 4!=(4×3×2×1)=24) watermarks as user IDs. As such, the user may be identified by any one of the 24 watermarks in the group of watermarks assigned to the user as a user ID. Use of such groups of watermarks as user IDs allows for the user to be more readily identified, since the user may be identified using any one of the watermarks included in the group of watermarks.

In some embodiments, a user may be assigned a subset of a group of watermarks as a user ID. Although less robust in relation to assigning an entire group of watermarks to a user as a user ID, assigning a subset of a group of watermarks to a user is still beneficial in that the user can still be more readily identified by any one of the assigned watermarks as compared to being identified by one watermark, for instance.

In some embodiments, watermarks may be generated using control characters that affect the appearance or behavior of neighboring characters. Watermarks generated using such control characters that affect the display order of text can be inserted into text content and the order of the affected text in the text content appropriately changed to counteract or otherwise negate the effect of the inserted watermark to cause the text to display as desired (e.g., in the unaffected order). Then, if the watermark is removed from the text content or otherwise altered with, the neighboring characters intended to be affected by the watermark displays as if affected by the watermark (e.g., the affected text content displays in an incomprehensible form and not as desired).

Referring now to FIG. 5, an illustrative watermark code map 500 includes a first column 502 in which text characters are listed and a second column 504 in which corresponding codes are listed. Code map 500 implements a code for encoding and/or decoding watermarks. The illustrative code map 500 of FIG. 5 comprises Unicode characters (ISO/IEC 10646) in code column 504.

More specifically, as can be seen in FIG. 5, code map 500 may be configured as a lookup table that includes mappings between text characters 502*a*-502*t* and corresponding ones of codes 504*a*-504*t*. Each of the codes in the code map is comprised of one or more (e.g. a combination of) code points (such as, for example, 506*a*, 506*b*, 506*c*).

A code point is any of the numerical values that make up a code space (i.e., a range of code points). Many code points represent single characters, but they can also have other meanings, such as for formatting. Unicode comprises on the order of 138,000 characters covering a wide range of modern and historic scripts, as well as multiple symbol sets and emoji and comprises 1,114,112 code points in the range $0_{hex}$ to $10FFFF_{hex}$.

Schemes other than Unicode may, of course, also be used. Such other schemes may have a different number of code points (i.e., fewer or more than the number of Unicode code points). For example, the character encoding scheme ASCII comprises 128 code points in the range $0_{hex}$ to $7\ F_{hex}$, Extended ASCII comprises 256 code points in the range $0_{hex}$ to $FF_{hex}$.

Significantly, code points selected for use in the watermark code map have neither a visual appearance nor do they affect the appearance or behavior of text characters (e.g., neighboring text characters) when the text characters are displayed.

Taking code 504*a* as representative of codes 504*b*-504*t*, code 504*a* is comprised of a plurality of, here three (3), code points 506*a*, 506*b*, 506*c*.

Taking as an example the text content "The big brown dog", the combination of code points ‮ and ‬ (identified by reference numerals 508*a*, 508*b*, respectively) of the code for the encoded text character J can be embedded anywhere within the text content (e.g., "The big bro‮ ‬ wn dog") and have no effect on the visual appearance of the text content when this text content is displayed.

That is, the text content having the embedded code "The big bro‮ ‬ wn dog" displays as "The big brown dog" when displayed (i.e., the "J" is not visible on the display). That is, the code comprised of code points #8238; ‬ has no visual appearance when the text content with the embedded code is displayed.

The combination of code points of any of the other codes in code map 500 may similarly be embedded into text content and neither have a visual appearance nor affect the appearance or behavior of the neighboring text characters when the text characters are displayed. It follows then that multiple codes can also be embedded into text content and neither have a visual appearance nor affect the appearance or behavior of the neighboring text characters when the text characters are displayed.

In some embodiments, the codes may be nested to generate new codes that do neither have a visual appearance nor affect the appearance or behavior of the neighboring text characters when the text characters are displayed. The new codes can be used to encode (i.e., map) additional text characters. For example, the code "‭ ‬" can be nested within the code "‮ ‬" to generate a new code "‮ ‭ ‬ ‬". A text character that is not included in the code map, such as, for example, the text character "K", can then be mapped to the newly generated code.

Watermarks that convey information, such as, for example, words and codes, can be generated using the text character encodings in the code map. The generated watermarks can then be embedded into text content and neither have a visual appearance nor affect the appearance or behavior of the neighboring text characters when the text characters are displayed. For example, the watermark "CAB" can be generated using the codes corresponding to the encoded text characters "C", "A", and "B" (i.e., "‪ ‏ ‬ ‭ ‎ ‬ ‮ ‎ ‬") from the code map. As another example, the watermark "DIG" can be generated using the codes corresponding to the encoded text characters "D", "I", and "G" (i.e., "‫ ‏ ‬ ‭ ‬ ‪ ‬") from the code map. The codes for the watermark and/or multiple watermarks can then be embedded into text content without having a visual appearance nor affecting the appearance or behavior of the neighboring text characters when the text characters are displayed.

In an embodiment, watermarks can include distinct encoded text characters generated using the text character encodings in the code map. The watermark "CAB" and the watermark "DIG" discussed above are two examples of such watermarks that include distinct encoded text characters. Another example of a watermark that includes distinct encoded text characters is the watermark "HIJ", which can be generated using the codes corresponding to the encoded text characters "H", "I", and "J" (i.e., "‫ ‬ ‭ ‬ ‮ ‬").

In some embodiments, watermarks that include combinations of the same encoded text characters can be used to generate groups of watermarks. For example, all the watermarks that include combinations of the encoded text characters "C", "A", and "B" may be combined to form a first group of watermarks, all the watermarks that include combinations of the encoded text characters "D", "I", and "G" may be combined to form a second group of watermarks, and all the watermarks that include combinations of the encoded text characters "H", "I", and "J" may be combined to form a third group of watermarks. Thus, in this example, the watermark "CAB" is a watermark in the first group of watermarks.

Similarly, the watermark "IDG" is a watermark in the second group of watermarks, and the watermark "IJH" is a watermark in the third group of watermarks. It will be appreciated in light of this disclosure that watermarks that include three distinct encoded text characters is only provided as an example, and that watermarks in a group of watermarks may include other numbers of distinct encoded text characters, such as two, four, five, seven, or any other suitable number of distinct encoded text characters.

In an example use case and embodiment, the encoded text characters from code map 500 can be used to generate watermarks that include identifiers, such as user identifiers (user IDs) that uniquely identify users of a system or server, users of a service, or employees or members of an organization.

Figure 6:
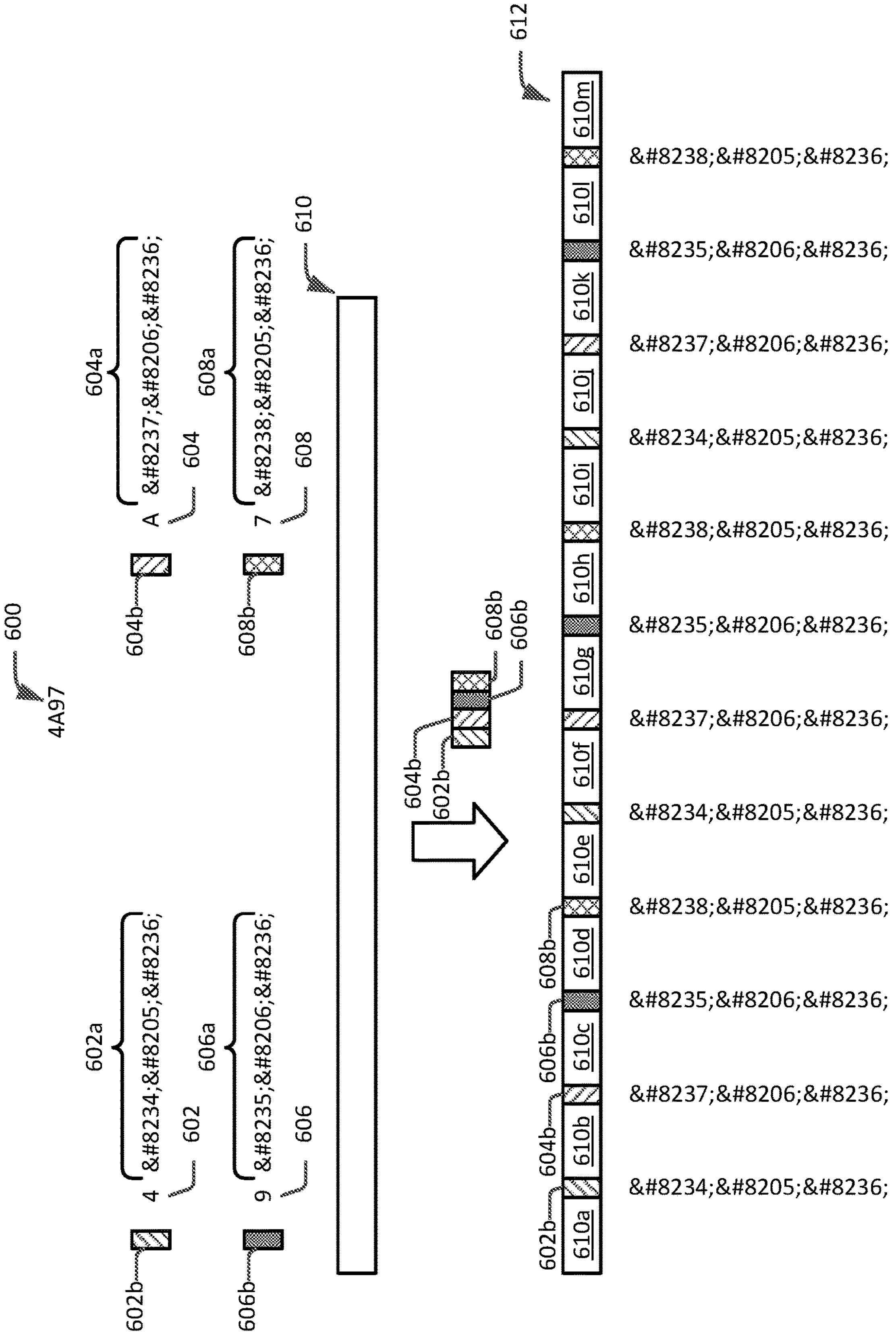
FIG. 6 is a diagram showing a watermark embedded into text content, in accordance with an embodiment of the present disclosure.

FIG. 6 illustrates one example of a watermark that includes identifiers. As illustrated in FIG. 6, the encoded text characters from code map 500 (FIG. 5) can be used to generate a user ID 600, which in this example corresponds to an alphanumeric string "4A97". User ID 600 can be used as a watermark.

In an embodiment, prior to embedding user ID watermark 600 (i.e., the codes of the user ID "4A97") into the text content, user ID watermark 600 may be segmented into watermark pieces, such that each watermark piece may be represented by one or more whole codes. In other words, user ID watermark 600 may be segmented into a plurality of watermark pieces with each watermark piece provided from one or more encoded text characters from user ID watermark 600.

In the example of FIG. 6, user ID watermark 600 is segmented into four pieces "4", "A", "9", "7" indicated by reference numerals 602, 604, 606, 608, respectively. It should, of course be appreciated that user ID watermark 600 may be segmented into a different number of pieces. For example, the user ID watermark "4A97" may be segmented into watermark pieces "4", "A", "97", or "4", "A97", or "4A" "97", or "4", "A9", "7", or "4A9", "7".

Watermark pieces 602, 604, 606, 608 have associated codes 602a, 604a, 606a, 608a, and are graphically represented by elements 602b, 604b, 606b, 608b.

Watermark pieces 602, 604, 606, 608 generated by segmenting user ID watermark 600 can then be embedded into text content 610. More specifically, the code(s) of the watermark pieces can be embedded into the text content as illustrated by reference numeral 612 with reference numerals 610a-610m representing portions of text content 610. Thus, watermark pieces 602, 604, 606, 608 are interspersed among portions of text content 610a-610m. More specifically and as can be seen in FIG. 6, codes 602a, 604a, 606a, 608a corresponding to watermark pieces 602, 604, 606, 608 are interspersed among portions of text content 610a-610m as represented by elements 602b, 604b, 606b, 608b.

In embodiments, respective codes 602a, 604a, 606a, 608a corresponding to watermark pieces 602, 604, 606, 608 (e.g., each user ID watermark piece) may be embedded at preconfigured or preestablished intervals, such as every five words, six words, seven words, ten words, fifteen words, or any suitable number of words. The interval size may be selected or tunable based on a desired level of security. Segmenting the user ID watermark and embedding the user ID watermark pieces into the text content in this manner may make it more difficult for the user ID watermark to be identified and possibly removed from the text content. As will be appreciated in light of this disclosure, the interval between the watermark pieces can vary greatly, and the claimed invention is not intended to be limited to any particular interval or range of intervals. Also, the intervals between watermark pieces need not be consistent but, in some cases, may vary. For example, the interval between a first watermark piece and a second watermark piece may be the same or different than the interval between the second watermark piece and a third watermark piece.

Further, in an embodiment, the watermark pieces (e.g., user ID watermark pieces) may be embedded into the text content in sequence, such as, by way of example, the sequence “4”, “A”, “9”, and “7” for the user ID watermark “4A97”. Additionally or alternatively, in some embodiments, the watermark pieces may be embedded into the text content multiple times. Continuing the example of user ID watermark 600, as can be seen in FIG. 6, respective codes 602*a*, 604*a*, 606*a*, 608*a* (“‪ ‍ ‬”, “‭ ‎ ‬”, “‫ ‎ ‬”, “‮ ‍ ‬”) of user ID watermark pieces 602, 604, 606, 608 are embedded into text content 610 three times and in sequence, as illustrated by reference numeral 612. Also, codes 602*a*, 604*a*, 606*a*, 608*a* (each user ID watermark piece) may be embedded into text content 610 such that the codes are distributed throughout text content 610, as illustrated by reference numeral 612.

In some cases, the embedded codes may be distributed throughout the document. For example, the embedded codes may be distributed evenly throughout the document. Embedding a user ID watermark into text document by distributing the codes may make the user ID watermark robust with respect to detection and removal in that it is difficult to identify and remove sufficient numbers of the embedded user ID watermark pieces to render the user ID watermark ineffective. Also note by distributing the codes throughout the text may make it possible to detect use of even portions of the text content since the used portions are likely to include sufficient numbers of embedded user ID watermark pieces to reconstruct the user ID watermark.

In another example use case of user ID watermarks and embodiment, a user may be assigned a group of user ID watermarks as the user's user ID. Taking as an example user ID watermark 600 corresponding to an alphanumeric string “4A97” above, a user may be assigned as user IDs the group of user ID watermarks that includes possible combinations of the encoded text characters “4”, “A”, “9”, and “7”. The assignment of this group of user ID watermarks to the user allows the user to be identified by any one of the user ID watermarks having the following combinations of encoded text characters:

| | | | |
|---|---|---|---|
| 4A97 | A974 | 974A | 74A9 |
| 4A79 | A794 | 794A | 94A7 |
| 49A7 | 9A74 | A749 | 749A |
| 497A | 97A4 | 7A49 | A497 |
| 47A9 | 7A94 | A947 | 947A |
| 479A | 79A4 | 9A47 | A479 |

Thus, one of the user ID watermarks (e.g., user ID watermark 600) from the group of user ID watermarks assigned to the user can be embedded into text content, such as by segmenting into pieces and embedding the user ID watermarks pieces at intervals (e.g., predetermined intervals) into the text content as variously described herein, and reconstruction of any one of the 24 user ID watermarks in the group of user ID watermarks (e.g., user ID watermark “9A74”) from a portion or portions of the text content unambiguously identifies the user.

Figure 7:
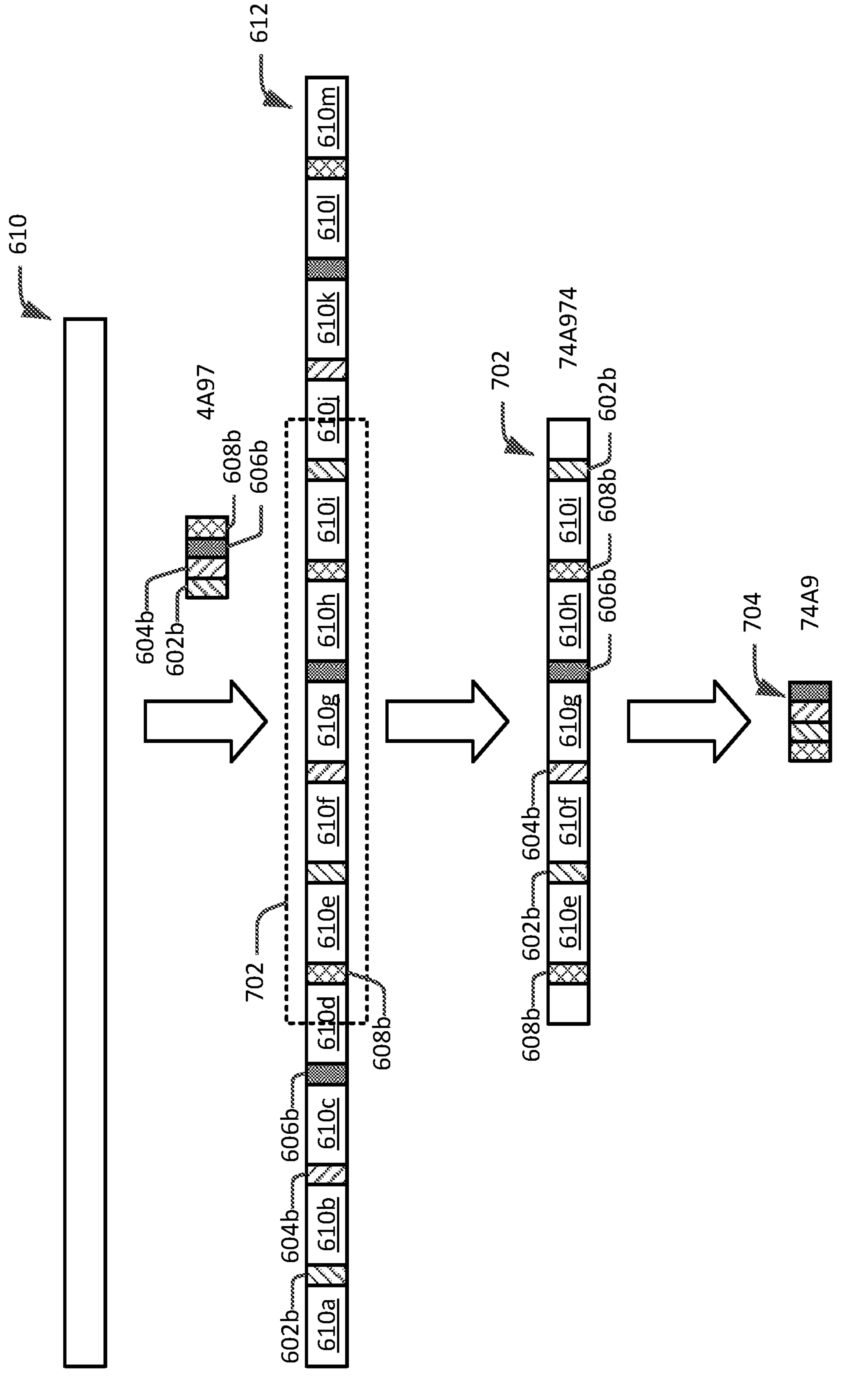
FIG. 7 is a diagram showing a reconstruction of the watermark from a portion of the text content of FIG. 6, in accordance with an embodiment of the present disclosure.

Continuing the example from FIG. 6 above, as can be seen in FIG. 7, use of a portion 702 of the text content (text content 610) embedded with the codes (“‪ ‍ ‬”, “‭ ‎ ‬”, “‫ ‎ ‬”, “‮ ‍ ‬”) of user ID watermark 600, as represented by elements 602*b*, 604*b*, 606*b*, 608*b*, may have been discovered or otherwise detected. In particular, portion 702 includes the sequence of watermark pieces 608, 602, 604, 606, 608, 602 (the sequence “7”, “4”, “A”, “9”, “7”, “4” as represented by elements 608*b*, 602*b*, 604*b*, 606*b*, 608*b*, 602*b*). The first four of the watermark pieces (watermark pieces 608, 602, 604, 606 as represented by elements 608*b*, 602*b*, 604*b*, 606*b*) may then be used to reconstruct a user ID watermark 704 (corresponding to an alphanumeric string “74A9”), which identifies the user. Note that the user can be identified using user ID watermark 704 even though user ID watermark 600 (corresponding to an alphanumeric string “74A9”) was embedded into text content 610 as illustrated by reference numeral 612. Also note that a user ID watermark corresponding to an alphanumeric string “4A97” and a user ID watermark corresponding to an alphanumeric string “A974” can be similarly reconstructed from portion 702, any of which may be used to identify the user. Thus, a user ID that unambiguously identifies the user can be readily reconstructed from a portion of the text content.

Figure 8:
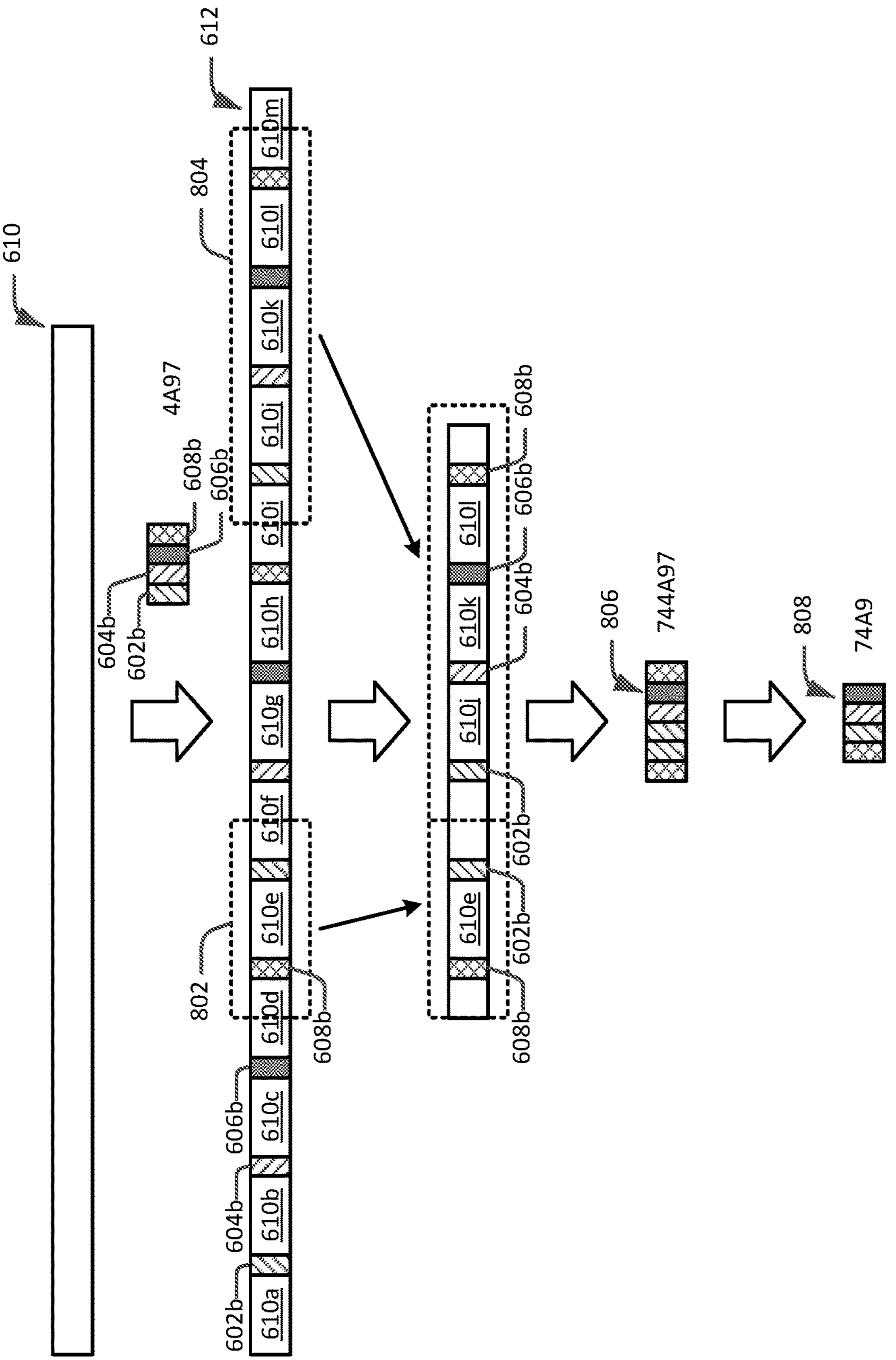
FIG. 8 is a diagram showing a reconstruction of the watermark from portions of the text content of FIG. 6, in accordance with an embodiment of the present disclosure.

In another example use case of user ID watermarks and embodiment, the user ID watermarks in a group of user ID watermarks may include distinct encoded text characters. Since the user ID watermarks include distinct encoded text characters, these user ID watermarks can be reconstructed by removing or otherwise discarding repeated instances of encoded text characters. Continuing with the example from FIGS. 6 and 7 above, as can be seen in FIG. 8, use of two portions 802 and 804 of the text content (text content 610) embedded with the codes (“‪ ‍ ‬”, “‭ ‎ ‬”, “‫ ‎ ‬”, “‮ ‍ ‬”) of user ID watermark 600, as represented by elements 602*b*, 604*b*, 606*b*, 608*b*, may have been discovered or otherwise detected. For example, a user may have cut-and-pasted portions 802 and 804 from text content 610 embedded with the codes of user ID watermark 600 as illustrated by reference numeral 612. In particular, portion 802 includes the sequence of watermark pieces 608, 602 (the sequence “7”, “4” as represented by elements 608*b*, 602*b*), and portion 804 includes the sequence of watermark pieces 602, 604, 606, 608 (the sequence “4”, “A”, “9”, “7” as represented by elements 602*b*, 604*b*, 606*b*, 608*b*). Thus, as can be seen, portions 802 and 804 when combined may include the sequence of watermark pieces 608, 602, 602, 604, 606, 608 as illustrated by the reference numeral 806 (the sequence “7”, “4”, “4”, “A”, “9”, “7” as represented by elements 608*b*, 602*b*, 602*b*, 604*b*, 606*b*, 608*b*). In this case, the repeated watermark piece (the second instance of watermark piece 602 as represented by element 602*b*) can be removed, and the first four watermark pieces after removal of the repeated watermark piece (watermark pieces 608, 602, 604, 606 as represented by elements 608*b*, 602*b*, 604*b*, 606*b*) may then use used to reconstruct a user ID watermark 808 (corresponding to an alphanumeric string “74A9”) which identifies the user. Note that a user ID watermark corresponding to the alphanumeric string “4A97” can be similarly reconstructed from portions 802 and 804 after removal of the repeated watermark piece. Either of the reconstructed user ID watermarks corresponding to the alphanumeric strings "74A9" or "4A97" is sufficient to identify the user.

In some embodiments, watermarks may be generated using control characters that affect the appearance or behavior of neighboring characters. In some embodiments, such control characters may be represented by corresponding code points. For example, adding the code points ‌ (code point representing the Zero Width Non-Joiner), ‍ (code point representing the Zero Width Joiner), ‎ (code point representing the Left-To-Right Mark), and ‏ (code point representing the Right-To-Left Mark) to text content affect the appearance or behavior of neighboring characters. Watermarks generated using such control characters that affect the display order of text can be inserted into text content and the order of the affected text in the text content appropriately changed to counteract or otherwise negate the effect of the inserted watermark to cause the text to display as desired (e.g., in the unaffected order). Then, if the watermark is removed from the text content or otherwise altered with, the neighboring characters intended to be affected by the watermark displays as if affected by the watermark.

Figure 9:
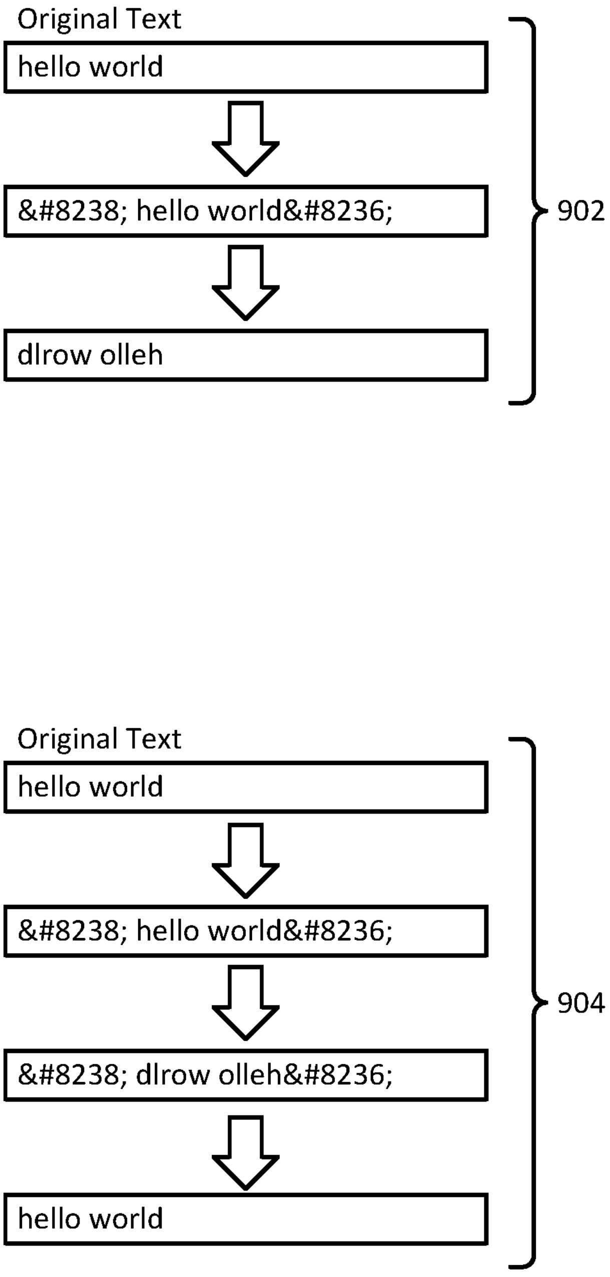
FIG. 9 are diagrams illustrating the use of a watermark that alters the display of the text content, in accordance with an embodiment of the present disclosure.

As can be seen by the top sequence of blocks 902 in FIG. 9, adding the code points ‮ and ‬ to the text "hello world" (e.g., ‮ hello world‬) causes the text to display in reverse order as "dlrow olleh". Thus, in order to cause the text affected by the insertion of such watermarks to display as desired (e.g., in the unaffected order), the affected text needs to be changed to counteract or otherwise negate the effect of the inserted watermark. For example, as can be seen by the bottom sequence of blocks 904 in FIG. 9, the affected text "hello world" can be changed to "dlrow olleh" (e.g., ‮ dlrow olleh‬), which, as an effect of the added watermark ‮ and ‬, causes the affected text to display as "hello world" when the text content is displayed. Note that if such watermarks are removed or otherwise tampered with, the affected text may be displayed in an incomprehensible order. Continuing the example above, if the watermark is removed, the text displays as "dlrow olleh", which is incomprehensible, when the text content is displayed.

In some embodiments, the watermarks generated to affect the appearance or behavior of neighboring characters may be embedded to affect the appearance of sensitive information in the text content. For example, in one such embodiment, rules may be generated that identify specific characters and/or words associated with sensitive information in text content. Examples of such characters and/or words include account, $, password, important, critical, address, personal, information, social security number, tax, and beneficiary, to provide some examples. The watermarks that affect the appearance of neighboring characters may then be embedded into the text content to affect the identified sensitive information in the text content. Note that the such watermarks may be embedded to affect the appearance of not just the identified characters and/or words but also the words and/or terms conveying the information associated with the identified characters and/or words.

In some embodiments, the various embodiments of the watermarks generated using the code map described above and watermarks generated to affect the appearance or behavior of neighboring characters may be combined in a text document. In other words, the watermarks generated using the code map and watermarks that affect the appearance or behavior of neighboring characters may be used jointly in a text document. FIG. 10 illustrates the use of watermarks generated using a code map and watermarks that alter the display of neighboring characters, in accordance with an embodiment of the present disclosure. As shown, text content 1002 may be embedded with both watermarks generated using the code map and watermarks intended to affect the behavior of neighboring characters. For example, as can be seen in such watermarked text content 1004, a first watermark ("‮#& 8236;") is embedded to cause the first word "Traditional" to display in reverse order. Thus, in watermarked text content 1004, the sequence of the letters of the word "Traditional" is changed to "lanoitidarT" to counteract the effect of the first watermark. A second watermark generated using the code map ("‪#& 8236;" which maps to the text character "J" in the code map) is embedded in a manner as to not affect the appearance of the neighboring text "application". A third watermark ("‫ ‏ #& 8236;") is embedded to cause the last letter "t" of the third word "management" to display as the first letter of the word. Thus, in watermarked text content 1004, the sequence of the letters of the word "application" is changed to "tmanagemen" to counteract the effect of the third watermark. A fourth watermark generated using the code map ("‭#& 8236;" which maps to the text character "I" in the code map) is embedded in a manner as to not affect the appearance of the neighboring text "solutions". As can be seen, watermarked text content 1004 includes other watermarks generated using the code map described above and watermarks generated to affect the appearance or behavior of neighboring characters. As long as the watermarks embedded into watermarked text content 1004 are not removed or otherwise tampered with, watermarked text content 1004 displays as text content 1002. That is, watermarked text content 1004 displays as intended to be displayed. However, if some or all of the watermarks embedded into watermarked text content 1004 are removed or otherwise tampered, watermarked text content 1004 does not display as intended. That is, watermarked text content 1004 does not display as text content 102. For example, watermarked text content 1004 may display as text content 1006 if the watermarks embedded to alter the display of neighboring characters are removed or tampered with.

Figure 11:
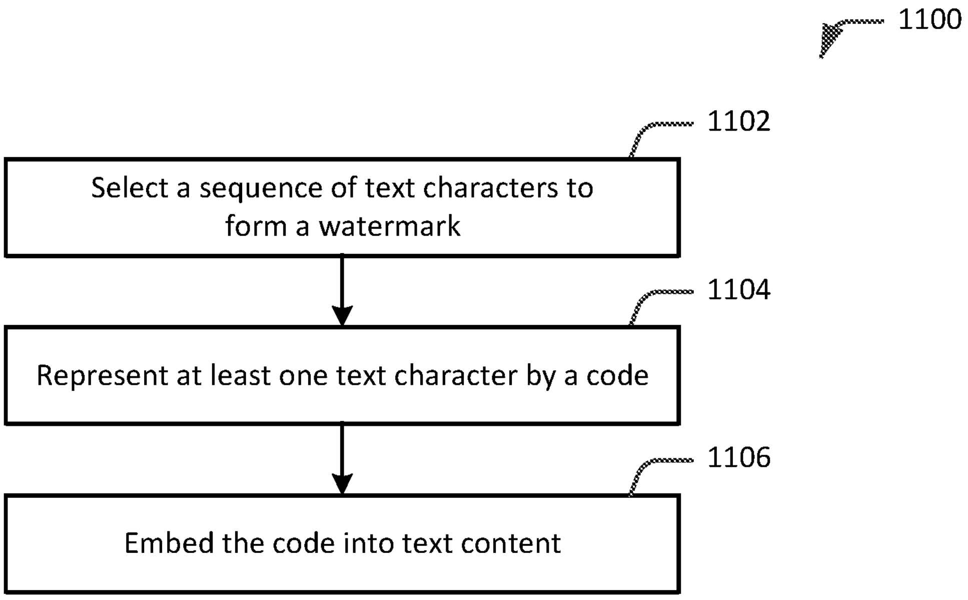
FIG. 11 is a flow diagram of an illustrative process for embedding a watermark into text content, in accordance with an embodiment of the present disclosure.

FIG. 11 is a flow diagram of an illustrative process 1100 for embedding a watermark into text content, in accordance with an embodiment of the present disclosure. For example, the operations, functions, or actions described in the respective blocks of example process 1100, and example process 1200 further described below, may be implemented by applications 412 and/or data 414 of computing device 400 of FIG. 4. Further, in some embodiments, the operations, functions, or actions illustrated in example process 1100, and example process 1200 further described below, may be stored as computer-executable instructions in a computer-readable medium, such as volatile memory 406 and/or non-volatile memory 408 of computing device 400.

With reference to example process 1100 of FIG. 11, at operation 1102, a sequence of text characters is selected to form a watermark. In an example use case, the formed watermark may identify a user that is to receive text content, and the watermark is to be embedded into the text content to identify the recipient of the text content.

At operation 1104, at least one text character of the sequence of text characters is represented by a code from a code map. In an implementation, the code, when inserted into text content, does not affect the visual appearance of the text content. In an embodiment, the watermark may optionally be segmented into watermark pieces. The watermark can be segmented at a code boundary (e.g., between two successive codes) such that each generated watermark piece includes one or more whole codes and not a portion of a code. Thus, the codes corresponding to the watermark pieces may be embedded into the text content without affecting the appearance of the text content.

At operation 1106, the code representing the at least one text character of the sequence of text characters is embedded into the text content as desired. The embedded code enables identification of the at least one text character upon extraction of the code from the text content. In embodiments where the watermark is segmented, the codes corresponding to the watermark pieces may be embedded into text content to digitally watermark the text content, for instance. In an embodiment, the codes corresponding to the watermark pieces may be embedded into the text content in sequence. In an embodiment, the codes corresponding to the watermark pieces may be embedded into the text content multiple number of times. In an embodiment, codes corresponding to the watermark pieces may be distributed within the text content.

Figure 12:
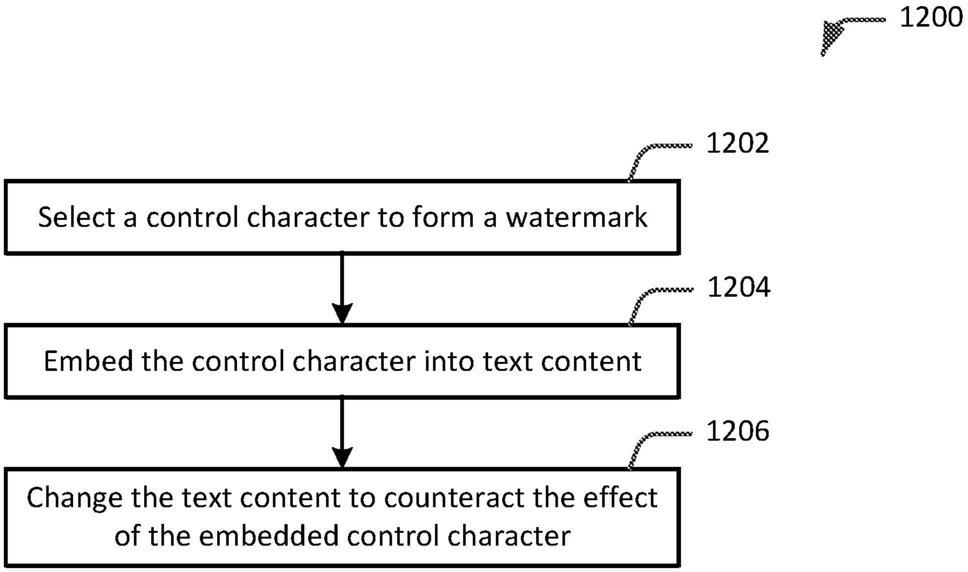
FIG. 12 is a flow diagram of an illustrative process for embedding into text content a watermark that alters the display of the text content, in accordance with an embodiment of the present disclosure.

FIG. 12 is a flow diagram of an illustrative process 1200 for embedding into text content a watermark that alters the display of the text content, in accordance with an embodiment of the present disclosure. At operation 1202, a control character (and, in some cases, one or more control characters) is selected to form a watermark. The selected control character(s) affects the appearance of neighboring text characters in text content when the control character(s) is embedded into the text content. For example, the control character may cause the neighboring text characters in the text content to display in reverse order. At operation 1204, the control character(s) is embedded into the text content in a manner as to intentionally affect the behavior of neighboring text characters in the text content. At operation 1206, the text content is changed to counteract the effect of the embedded control character(s). For example, the order of the text characters in the text content affected by the control character may be changed to cause the text content to display as desired when the text content is displayed.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
- selecting a sequence of text characters to form a watermark;
- representing at least one text character of the sequence of text characters by a first code from a code map which, when inserted into text content, the first code does not affect an appearance of the text content, wherein the code map comprises a plurality of mappings between text characters and corresponding code, wherein each code in the code map defines a combination of code points; and
- embedding the first code which represents the at least one text character of the watermark into the text content so that the first code enables identification of the at least one text character upon extraction of the first code from the text content.

2. The method of claim 1, wherein the first code includes Unicode encodings.

3. The method of claim 1, wherein:
- representing at least one text character of the sequence of text characters by the first code comprises representing a plurality of text characters by a corresponding plurality of codes from the code map which, when inserted into the text content, does not affect the appearance of the text content; and
- embedding the corresponding plurality of codes into the text content by distributing the plurality codes within the text content so as to make detection of the watermark more difficult.

4. The method of claim 1, wherein embedding the first code into the text content further comprises embedding the first code into the text content at a first location, and embedding a second code representing a second text character of the sequence of text characters into the text content at a second location different from the first location, wherein the second code is from the code map.

5. The method of claim 1, wherein embedding the first code comprises embedding the first code multiple times into the text content.

6. The method of claim 1, wherein the sequence of text characters conveys user identification information.

7. The method of claim 1, wherein the sequence of text characters is a sequence of distinct text characters.

8. The method of claim 1, wherein the watermark formed using the sequence of text characters is a first watermark, the method further comprising:
- selecting one or more code points to form a second watermark, wherein
- the one or more code points affects the appearance of text in the text content;
- embedding the one or more control characters code points of the second watermark into the text content; and
- changing a sequence of the text in the text content to counteract an effect of the embedded one or more code points.

9. The method of claim 8, wherein the one or more code points of the second watermark is embedded into the text content based on a rule configured to identify sensitive information in the text content.

10. A method comprising:
- selecting one or more code points to form a watermark, wherein the one or more code points, when inserted into text content, affects an appearance of text in the text content;
- embedding the one or more code points of the watermark into the text content; and
- changing a sequence of the text in the text content to counteract an effect of the embedded one or more code points such that the text content appears as intended when displayed.

11. The method of claim 10, wherein the one or more code points of the watermark is embedded into the text content based on a rule configured to identify sensitive information in the text content.

12. The method of claim 10, wherein the one or more code points of the watermark is embedded into the text content multiple times.

13. A system comprising:
- a memory; and
- one or more processors in communication with the memory and configured to, select a sequence of text characters to form a watermark;
  - represent at least one text character of the sequence of text characters by a first code from a code map which, when inserted into text content, the first code does not affect an appearance of the text content, wherein the code map comprises a plurality of mappings between text characters and corresponding code, wherein each code in the code map defines a combination of code points; and
  - embed the first code which represents the at least one text character of the watermark into the text content so that the first code enables identification of the at least one text character upon extraction of the first code from the text content.

14. The system of claim 13, wherein to embed the first code into the text content further comprises embed the first code into the text content at a first location, and embed a second code representing a second text character of the sequence of text characters into the text content at a second location different from the first location, wherein the second code is from the code map.

15. The system of claim 13, wherein to embed the first code into the text content further comprises embed the first code into the text content multiple times at different locations in the text content.

16. The system of claim 13, wherein the sequence of text characters is a sequence of distinct text characters.

17. The system of claim 13, wherein the sequence of text characters conveys a name.

18. The system of claim 13, wherein the watermark formed using the sequence of text characters is a first watermark, the one or more processors in communication with the memory further configured to:
- select one or more code points to form a second watermark, wherein the one or more code points, when inserted into the text content, affects the appearance of text in the text content;
- embed the one or more code points of the second watermark into the text content; and
- change a sequence of the text in the text content to counteract an effect of the embedded one or more code points such that the text content appears as intended when displayed.

19. The system of claim 18, wherein the one or more code points of the second watermark is embedded into the text content based on a rule configured to identify sensitive information in the text content.

20. The system of claim 18, wherein the first code is embedded into the text content based on a rule configured to identify sensitive information in the text content.

* * * * *